United States Patent

[11] 3,614,655

| [72] | Inventor | Bouwe Bolger<br>Emmasingel, Eindhoven, Netherlands |
|---|---|---|
| [21] | Appl. No. | 341,633 |
| [22] | Filed | Jan. 31, 1964 |
| [45] | Patented | Oct. 19, 1971 |
| [73] | Assignee | U.S. Philips Corporation<br>New York, N.Y. |
| [32] | Priority | Feb. 22, 1963 |
| [33] | | Netherlands |
| [31] | | 289372 |

[54] OPTICAL MASER MODULATOR USING INTERFERENCE BETWEEN TWO PORTIONS OF THE OUTPUT BEAM
20 Claims, 8 Drawing Figs.

[52] U.S. Cl............................................. 331/94.5,
350/160, 350/163, 356/106
[51] Int. Cl............................................. H01s 3/10
[50] Field of Search............................................. 331/94.5; -
350/160–163, 266, 269; 88/14 I; 250/199; 332/7.5

[56] References Cited
UNITED STATES PATENTS

| 2,882,787 | 4/1959 | Mitchell | 88/14 |
| 3,202,052 | 8/1965 | Rambauske | 88/14 |
| 3,243,724 | 3/1966 | Vuylsteke | 331/94.5 |

FOREIGN PATENTS

| 342,219 | 1/1931 | Great Britain | 88/14 |
| 608,711 | 3/1962 | Belgium | 331/94.5 |

Primary Examiner—William L. Sikes
Assistant Examiner—Edward S. Bauer
Attorney—Frank R. Trifari ABSTRACT: An optical maser of the kind comprising reflecting means at opposite ends of the active medium. A semitransparent mirror is included in the optical system so that the beam is divided into a reflected portion and a transmitted portion. Additional reflecting means are provided for returning the divided beam to the semitransparent mirror. Means are provided for controlling the length of the optical path between the semitransparent mirror and the reflecting means in order to control the phase difference between the reflected radiations. In this way, it is possible to modify, so to speak, the load on the maser and thus control the intensity of the emerging beam. The optical path length can be adjusted by mounting the reflecting means on an electrically controllable piezoelectric or magnetostrictive body. As an alternative, an electrooptic body can be included in the optical path.

PATENTED OCT 19 1971

INVENTOR.
BOUWE BÖLGER
BY
Frank R. Trifari
AGENT

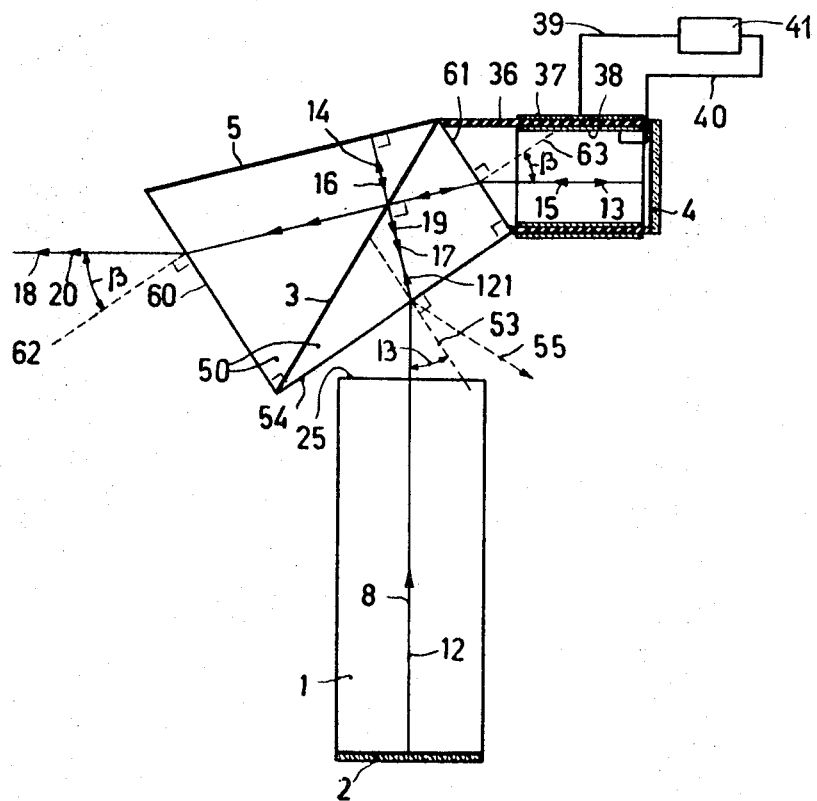
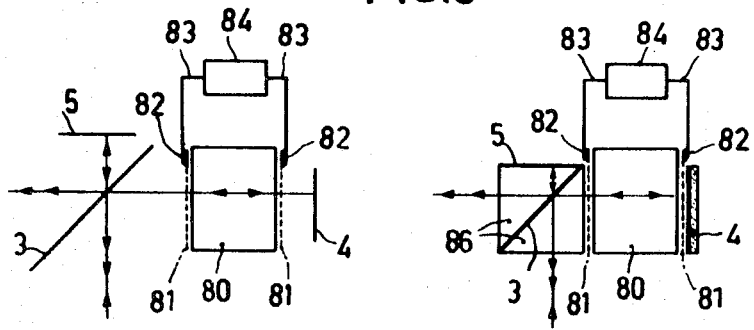
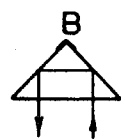
FIG.5
FIG.6
FIG.7
FIG.8

OPTICAL MASER MODULATOR USING INTERFERENCE BETWEEN TWO PORTIONS OF THE OUTPUT BEAM

The invention relates to an optical maser comprising a space in which stimulated emission of radiation can be produced and comprising two reflecting members between which the emitted radiation can reciprocate through said space, at least one of the reflecting members being partially transparent in order to allow a beam of rays to emerge.

A medium suitable for stimulated emission of radiation comprises at least two energy levels; the higher level may have a greater population than the lower level. The energy levels may correspond to energy states of electrons in the medium and the greater population of the higher level may be obtained in known manner by physical agency by shifting electrons to a higher energy state, for instance by means of incident radiation, or, in the case of a gaseous medium, by means of a gas discharge. This is sometimes termed "pumping" or "supplying pump energy".

Stimulated emission of radiation is to denote, as usual, the transition from a higher energy level to a lower energy level, while radiation is emitted under the action of radiation (stimulating radiation) having a wavelength corresponding to the energy difference between the levels. In contrast thereto, spontaneous emission denotes such a transition, while radiation is emitted without the action of stimulating radiation. The radiation obtained by stimulated emission is in cophase and correlative to the stimulating radiation which is thus amplified so that a coherent radiation is obtained. By causing the stimulating radiation to cover a long path through the medium by means of two reflecting members, for example formed by flat or curved mirrors, the radiation thus reciprocating through the medium between said reflecting members, stimulated radiation is constantly added to the stimulating radiation, while constantly radiation can emerge via a reflecting member, which is partially transparent.

The term "transparent" is to be understood to mean herein transparent to the radiation obtained by stimulated emission.

The stimulated emission may be initiated by stimulating radiation from an external source. The stimulated emission may, as an alternative, be initiated by radiation produced in the medium by spontaneous emission. An optical maser is to denote, as usual, a maser in which, by stimulated emission, radiation is obtained, the wavelength of which lies in the range of visible light or in adjacent ranges, for example, of infrared radiation or ultraviolet radiation.

As stated above, one of the reflecting members of the optical maser is partially transparent in order to obtain an emerging beam. Such a reflecting member usually consists of a partially transparent, flat or curved mirror.

The invention is based inter alia on the idea that with these known optical masers the intensity of the emerging beam is commonly not the intensity obtainable at a maximum with the actual supply of pump energy.

A further recognition underlying the invention is that an optical maser may be considered to form a kind of generator providing the maximum energy output with a correct adaptation of the load and that a correct adaptation of the load for optimum energy output requires the use of an adjustable load. With an optical maser the energy is delivered in the form of the emerging beam and of radiation lost by stray, absorption, diffraction or the like on or in the parts of the optical maser.

The invention has for its object to provide inter alia an optical maser with an adjustable load in which the intensity of the emerging beam can be adjusted in a simple manner substantially to its maximum value.

In accordance with the invention an optical maser of the kind set forth is characterized in that at least one reflecting member comprises a substantially flat, partially transparent dividing mirror, a normal to the mirror surface being at an acute angle between 0° and 90° to the optical axis between the reflecting members, this optical axis being the axis line of the optical path covered by the radiation reciprocating between the reflecting members. The dividing mirror divides radiation from the other reflecting member into a transmitted or passing beam and a reflected beam, the one reflector member comprising, in addition, two substantially nontransparent reflector mirrors, which reflect said beams back to the dividing mirror, where said beams are both divided into a passing portion and a reflected portion, while two substantially coinciding portions, a reflected portion and a passing portion, emerge and form an emerging beam of rays, and two substantially coinciding portions, a reflected portion and a passing portion, return to the other reflector member and in that there are furthermore provided means with the aid of which the optical path length can be varied between the dividing mirror and at least one of the reflector mirrors.

By controlling the length of the optical path between the dividing mirror and at least one of the reflector mirrors the interference between the emerging portions and the portions returning to the other reflecting member is at the same time controlled, or, in other words, the intensities of the emerging beam and of the radiation returning to the other reflecting member are controlled. This means that the transparency of the one reflecting member is controlled, which may be considered to be the control of the load of the optical maser.

There exists a nonlinear dependence between the transparency of the one reflecting member and the intensity of the emerging beam, so that with an increasing transparency the intensity of the emerging beam first increases, after which it decreases. By measuring the intensity of the emerging beam by means of a photoelectric cell during the load control, this intensity can be adjusted in a simple manner to its maximum value or to a different, desired intensity value.

In principle radiation reciprocates, in operation, between the other reflecting member and the said reflector mirrors, while the other reflecting member and the reflector mirrors may be formed in a simple manner by flat or curved mirrors conventionally used in optical masers.

The energy reflection of the dividing mirror may amount to 50 percent, that is, 50 percent of the incident energy is reflected in the form of radiation. In this case the transparency of the one reflecting member may be controlled between a full degree of transparency and a full degree of opacity by controlling the said length of the optical path. With a transparency lying between these extreme limits, the maximum intensity of the emerging beam is obtained, usually with a transparency lying comparatively near the full degree of opacity. The energy reflection of the dividing mirror is preferably less than 50 percent or more than 50 percent, or even less than 15 percent or more than 85 percent. In this case the reflecting member cannot be completely transparent, so that the transparency can be controlled only between narrower limits with the same variation in length of the optical path between the dividing mirror and a reflecting mirror, a more accurate control of the intensity of the emerging beam being thus possible. Moreover, in this case the risk of extinction of the maser (no stimulated emission) is reduced, which risk occurs with a high degree of transparency of a reflecting member, during the control of the intensity of the emerging beam.

It is particularly advantageous to provide means for varying the length of the optical path between the dividing mirror and the reflector mirror, from which the reflected beam emanating from the dividing mirror is reflected, if the energy reflection of the dividing mirror is less than 50 percent while if the energy reflection of the dividing mirror is more than 50 percent, there are provided means for varying the length of the optical path between the dividing mirror and the reflector mirror, on which the passing beam from the dividing mirror is reflected.

With a view to a simple and compact structure a reflector mirror and the dividing mirror may be integral with each other. In a preferred embodiment the reflector mirrors are substantially flat mirrors, while one of the reflector mirrors is provided on a side face of a transparent body and the dividing mirror is arranged in a diagonal plane of said body, the transparent body having a quadrangular sectional area at right angles to the said diagonal plane. The structure is particularly simple if a perpendicular to the dividing mirror is at an angle of about 45° to the optical axis between the reflecting members, while the transparent body has a square section at right angles to the diagonal plane.

If the optical maser comprises an elongated solid medium, in which the stimulated emission of radiation is produced, for example a rod-shaped ruby, the transparent body may be formed by an end portion of said elongated solid medium, so that a particularly simple and compact structure is obtained.

In order to avoid troublesome reflections it is advisable to provide the transparent body with antireflection layers. These antireflection layers may be dispensed with in a further preferred embodiment, which is characterized in accordance with the invention in that a perpendicular to the plane of incidence, formed by the side face of the transparent body opposite the side face provided with a reflector mirror, is at an angle equal to the Brewster angle to the optical axis between the reflecting members, while parallel to said axis radiation incident to the plane of incidence of the transparent body can emanate from the transparent body via a side face only in a direction which is at an angle equal to the Brewster angle to a perpendicular to the side face through which the radiation emerges from the body.

With a body having refractive index $n$ in the ambience, for example air, the Brewster angle is to denote, as usual, an angle $\beta$ of incidence for incident radiation in which radiation of only one polarization direction is reflected and where $tg\beta = n$.

Since radiation of only one polarization direction is reflected by the transparent body, radiation of this polarization direction can practically not reciprocate between the reflecting members, so that it is not amplified by stimulated emission and reflection of this radiation gives substantially no losses.

The means of control of the length of the optical path between the dividing mirror and a reflector mirror may be formed in a simple manner by members capable of displacing a reflector mirror. The mirror may be displaced for example by means of setscrews. However, a displacement may be carried out readily and accurately by means of a piezoelectric body or a body having magnetostriction. It is known that a dimension of a piezoelectric crystal can be varied by applying a voltage to the body and a dimension of a body having magnetostriction with the aid of a magnetic field.

It is very advantageous to cause the piezoelectric body or the body having magnetostriction to establish simultaneously the mechanical connection between the said transparent body and the displaceable reflector mirror. A particularly advantageous structure is obtained in this case by means of a piezoelectric body formed by a cylinder of piezoelectric material having internally and externally a metallized surface, between which surfaces an electrical voltage can be applied, while the cylinder is closed at each end by the displaceable reflector mirror and the transparent body respectively, or by means of a body having magnetostriction formed by a cylinder of magnetostriction material, the cylinder being surrounded by a conductive winding while the displaceable reflector mirror and the transparent body close the cylinder each on one side.

The cylinder may be fastened by cementing or clamping means to the transparent body and a reflector mirror.

The transparent body may be made of glass or quartz. It may comprise two portions between which the dividing mirror is arranged. The dividing mirror may consist of a metallized face of one of the two portions, which is fastened to the other portion by cementing or clamping. The dividing mirror may also be formed by a dielectric layer conventionally used in optics for mirrors.

As stated above, the transparency of a reflecting member and hence the intensity of the emerging beam of an optical maser according to the invention can be controlled so that the emerging beam has maximum intensity. It will be obvious that by controlling the transparency of a reflecting member the emerging beam can also be modulated.

For the modulation it is desirable to have a possibility of rapidly varying the transparency, to which end a preferred device embodying the invention is characterized in that the means for controlling the length of the optical path between the dividing mirror and a reflector mirror comprise an electrooptical body arranged between the dividing mirror and a reflector mirror and traversed by the radiation reciprocating between said mirror, while with the aid of the electro-optical body the said length of the optical path can be varied. The term "electro-optical body" is, as usual, denoting a body with a variable refractive index by voltage application. The invention will now be described more fully with reference to the drawing which shows a few embodiments.

FIGS. 1 to 5 show diagrammatically in a sectional view various embodiments of an optical maser according to the invention.

FIGS. 6 and 7 show diagrammatically in a sectional view embodiments of a reflecting member according to the invention.

Figure 1:
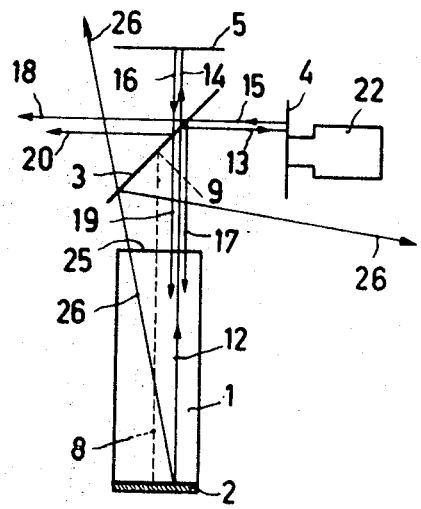

FIG. 8 shows diagrammatically in a sectional view a total-reflection roof prism. The embodiment shown diagrammatically in FIG. 1 of an optical maser according to the invention comprises a apace 1 containing a medium in which stimulated emission of radiation can be produced. The medium may be any medium suitable for use in an optical maser. The space 1 is provided on one side with a reflecting member, formed in this embodiment by a flat mirror 2.

The invention is embodied in the reflecting member (3, 4, 5), lying opposite the reflecting member 2 and comprising three mirrors 3, 4 and 5. The generated radiation reciprocates between the reflecting members 2 and (3, 4, 5); thus, the end surface 25 or the space 1 must be transparent.

The pump energy may be supplied to the medium for example by incident radiation, to which end the side faces of the space 1 must be transparent or, in the case of a gaseous medium, for example a helium-neon mixture, it can be supplied by the gas discharge in the medium, to which end suitable electrodes must be provided in the space 1. The sources of pump energy are unessential for this invention and are not shown in the FIGS.

The space 1 may be formed by a glass tube, closed at one end by the mirror 2 formed by a metallized glass plate and at the other end 25 by a glass plate, which may be provided with antireflection layers. If the medium is a solid substance, for example formed by a rod-shaped ruby with substantially parallel end faces, the space 1 may be formed by the medium itself. The mirror 2 may then be formed by a metallized end face of the ruby and on the opposite side 25 of the ruby there may be provided an antireflection layer. With many known masers the medium is formed by a rod-shaped ruby.

The flat reflector mirror 5 is parallel to the mirror 2 and the flat reflector mirror 4 is at right angles to the mirrors 2 and 5.

The mirrors 5 and 4 may be formed by metallized glass plates.

The flat, partially transparent dividing mirror 3 is at an angle of 45° to the mirrors 2, 4 and 5. The dividing mirror 3 may be formed by a unilaterally metallized glass plate. The other side of this glass plate may be provided with an antireflection layer. The mirrors 2, 3, 4 and 5 must be considered to be orthogonal to the plane of the drawing.

In operation radiation reciprocates between the reflecting members 2 and (3, 4, 5) via the space 1, 8 designates the optical axis of the light path across the space 1. The angle between the optical axis 8 and the normal 9 to the mirror 3 is 45°. A radiation 12 from the mirror 2 strikes the dividing mirror 3, where it is divided into a reflected beam 13 and a transmitted or passing beam 14. The beams 13 and 14 are reflected by the reflector mirrors 4 and 5 respectively back to the dividing mirror 3. Subsequent to reflection at the mirrors 4 and 5 the beams 13 and 14 are designated by 15 and 16 respectively. The beams 15 and 16 are divided by the dividing mirror 3 both in two portions. The beam 15 is divided into a passing portion 18 and a reflected portion 17 and the beam 16 into a reflected portion 20 and a passing portion 19. The portions 18 and 20 form the emerging beam, whereas the portions 17 and 19 return to the mirror 2 and maintain the stimulated emission in the space 1, so that they are again amplified. Subsequent to reflection from the mirror 2, the said process is repeated.

The radiation 12 travels in a direction substantially orthogonal to the flat mirror 2 and only in this case the said repetition and hence the maintenance of the stimulated emission is possible the beams 13 and 15 and 14, 16 are in this case substantially at right angles to the reflector mirrors 4 and 5 respectively. A radiation 26, which travels in a different direction, cannot attain a high intensity by stimulated emission and gets lost subsequent to one or several reflections from one or more mirrors.

Figure 2:
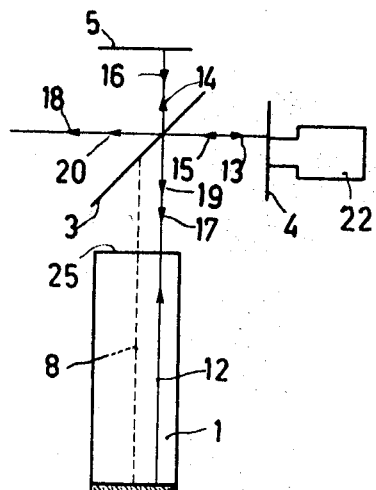

The beams 13, 15 and 14, 16 are shown, for the sake of clarity, in relatively shifted positions. It will be evident that in reality the beams 13, 15 and the beams 14, 16 coincide, like the beams 18, 20 and 12, 17, 19, so that the situation is, in fact, as is shown in FIG. 2.

The phase difference between the portions 18 and 20 can be controlled by displacing the reflector mirror 4 in the direction of the beams 13 and 25 by means of the members 22, shown diagrammatically.

The members 22 may be formed by a sledge along which the mirror 4 is adapted to slide, whilst use is made of a set of micrometer screws. The members comprise, however, preferably a piezoelectric crystal, one dimension of which can be varied, as is known, by means of an electric field. The mirror is connected with the piezoelectric crystal, whilst the dimension of this crystal in the direction of the beams 13 and 15 can be varied.

By controlling the phase difference between the portions 18 and 20, the interference between these portions, which may amplify or attenuate each other, is controlled. This means that the intensity of the emerging beam (18, 20) is varied. This is attended by a control of the intensity of the returning beam (17, 19).

If the intensity of the beam 12 is designated, at a given instant, by A, the intensity I of the emerging beam (18, 20) can be given by:

$$I=2AR(1-R)(1-\cos \Phi) \quad (1)$$

and the intensity $I_t$ of the returning beam (17, 19) can be given by:

$$I_t=A-2R(1-R)(1-\cos \Phi) \quad (2)$$

wherein $\Phi$ is the phase difference between the portions 18 and 20 and R the energy reflection of the dividing mirror 3.

The transparency D of the reflecting member (3, 4, 5) may be indicated by:

$$D=2R(1-R)(1-\cos \Phi), \quad (3)$$

so that I can be given by:

$$I=DA. \quad (4)$$

D may assume its maximum value, when the energy reflection of the dividing mirror is 50 percent ($R=\frac{1}{2}$), whereas $\cos \Phi=-1$. Then $D=1$, that is the reflecting member (3, 4, 5) is completely transparent. I is, however, not at a maximum in this case, since A also depends upon D and with $D=1$ $I_t=0$, so that no stimulated emission is any longer possible and A is equal to zero. This means that with $D=1$ I becomes zero (extinction of the optical maser).

With which value of D the intensity I of the emerging beam is at a maximum must be empirically determined for each individual case by measuring I, for example with the aid of a photoelectric cell, while $\Phi$ is varied by a displacement of the mirror 4.

The energy reflection of the dividing mirror 3 is preferably lower or higher than 50 percent ($R<\frac{1}{2}$ or $R>\frac{1}{2}$), or it may even be lower than 15 percent or higher than 85 percent. The reflecting member (3,4,5) can then not be completely transparent, so that D can be varied only between narrower limits with the same displacement of the mirror 4 (that is, with control of $\cos \Phi$ between $-1$ and $+1$). Thus a more accurate control of I is obtained. Moreover, the risk of extinction of the optical maser during said control is at least reduced.

The energy reflection of the dividing mirror 3 may for example be 10 percent ($R=1/10$). In this case D is at the maximum equal to 0.36 or 36 percent. I can then be accurately controlled, while in practice all known media may be used, since I assumes its maximum value with these media for a value or D lower than 36 percent.

If the energy reflection of the dividing mirror 3 is more than 50 percent the mirror 5 instead of the mirror 4 is preferably displaced during the control of D, since better results are thus obtained. The members 22 are than connected with the mirror 5.

Figure 3:
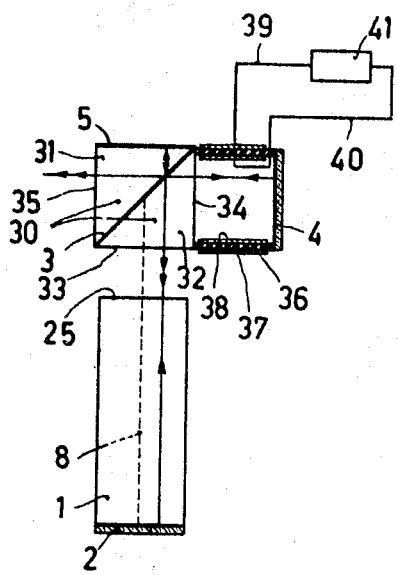

FIG. 3 shows an optical maser embodying the invention, having a simple and compact structure, in which the reflector mirror 5 and the dividing mirror 3 are integral with each other by means of a transparent body 30, for example of glass or quartz. (In FIG. 3 and in the further FIGS. the same reference numerals are employed as far as possible as in FIGS. 1 and 2).

The reflector mirror 5 is arranged on a sideface of the transparent body 30, whereas the dividing mirror 3 is arranged in a diagonal plane of the body 30. The body 30 has a square sectional area at right angles to the diagonal plane in which the mirror 3 is arranged. The mirror 5 may be a metallized face of the body 30. The transparent body 30 consists of two portions 31 and 32. The mirror 3 may be formed by a metallized face of the portion 31, to which the portion 32 may be fastened by cementing or clamping. The mirror 3 may also be formed by a narrow airgap between the portions 31 and 32. This gap may have a thickness of about half the wavelength of the radiation emanating from the space 1.

The side faces 33, 34 and 35 of the body 30 are preferably provided with antireflection layers.

Between the reflector mirror 4 and the transparent body 30 there is arranged a piezoelectric body, here formed by a cylinder 36, which establishes the mechanical joint between the transparent body 30 and the reflector mirror 4. The body 30 and the reflector mirror 4 are fastened for example by cementing to the cylinder 36 and close the latter at both ends.

The cylinder 36 has an externally metallized face and an internally metallized face 37 and 38 respectively, which are connected via the supply conductors 39 and 40 respectively to a voltage source 41 (shown diagrammatically). By controlling the voltage between the metallized faces 37 and 38 by means of the voltage source 41 the length of the cylinder 36 can be varied, so that the distance between the body 30 and the reflector mirror 4 can be regulated.

The cylinder 36 may consist, for example, of barium titanate, and the inner and outer surfaces may be coated with gold.

In this embodiment the three mirrors 3, 4 and 5 are joined to form a simple, compact and readily maintainable unit.

The transparent body 30 may close the side 25 of the space 1.

Figure 4:
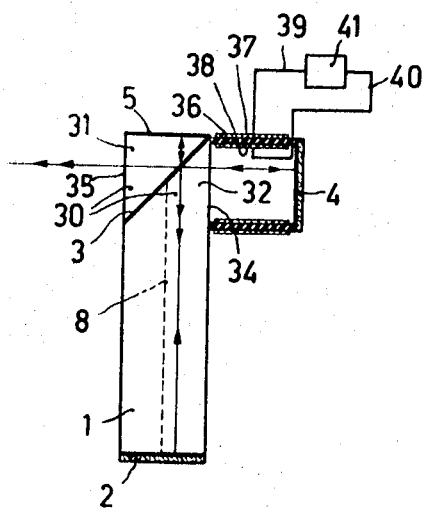

FIG. 4 shows an advantageous structure of a solid-substance maser according to the invention in which stimulated emission is produced in a solid body 1. The body 1 may be a rod-shaped ruby having a square section. The transparent body 30 is formed in this case by an end portion of the rod-shaped ruby 1 itself. Otherwise this optical maser is identical to that shown in FIG. 3. It should be noted that the centers in the ruby 1 allowing the stimulated emission are preferably not contained in the said end portion.

It is advisable to provide the side faces 33, 34 and 35 of the transparent body 30 (see FIGS. 3 and 4) with antireflection layers in order to avoid troublesome reflections.

FIG. 5 shows an optical maser according to the invention comprising a transparent body 50, the shape of which permits of omitting antireflection layers. The reflector mirror 5 is applied to a side face of the body 50. The body 50 comprises two portions 51 and 52, between which the reflector mirror 3 is arranged, which extends along a diagonal plane of the body 50. The body 50 has a square section at right angles to said diagonal plane.

The perpendicular 53 to the plane of incidence 54 opposite the reflector mirror 5 is at an angle $\beta$ equal to the Brewster angle to the optical axis 8 between the reflecting members 2 and (3, 5, 4). (The optical axis 8 coincides with the ray 12 shown). If the refraction index of the material of the body 50 is $n$, $\tan \beta = n$.

Of the radiation 12 incident to the plane 54 only a radiation 55 of one polarization direction is reflected. This radiation 55 cannot return into the space 1, so that radiation of this polarization direction is not amplified by stimulated emission, and it does substantially not produce losses.

The radiation 121 entering the body 50 is incident to the dividing mirror 3 at an angle of 45° and the passing portion 14 of this radiation is incident to the reflector mirror 5 substantially at right angles and returns to the dividing mirror 3 (radiation 16) an is split up into an emerging portion 20 and a returning portion 19. The side face 60 of the body 50 is at right angles to the plane of incidence 54, so that the emerging radiation 20 is at the Brewster angle $\beta$ to the perpendicular 62 to the side face 60 and substantially no troublesome reflections will occur on this side face.

The reflected portion 13 of the radiation 121 reflected from the dividing mirror 3 is reflected by the reflector mirror 4 towards the dividing mirror 3 (radiation 15) and is split up into an emerging portion 18 and a returning portion 17. The side face 61 is also at right angles to the plane of incidence 54, so that the portions 13 and 15 between the side face 61 and the reflector mirror 4 are at the Brewster angle $\beta$ to the perpendicular 63 to the side face 61 and also at this side face substantially no troublesome reflections will occur.

The cylinder 36 of piezoelectric material has in this case a shape adapted to the acute angle between the side face 61 and the reflector mirror 4.

For modulation purposes the length of the optical path between the dividing mirror 3 and the reflector mirror 4 is preferably controlled with the aid of an electro-optical crystal 80 (see FIG. 6) By applying a voltage to the body of electro-optical material, the refractive index of this material is varied, so that the length of the optical path through this material also varies. The crystal 80 may consist, for example, of $KH_2PO_4$, known in literature under the name of KDP. The body is provided on two opposite sides with tin oxide layers 81, which are electrically conductive and transparent. By means of silver paste 82 the supply conductors 83 are connected to the layers 81. The supply conductors 83 are connected to a variable voltage source 84. This device permits of obtaining modulation frequencies of for example about 20,000 mc./s, which is substantially not possible by means of a piezoelectric body.

FIG. 7 shows the electro-optical body 80 between a transparent body 86 and the reflector mirror 4. The transparent body 86, the electro-optical body 80 and the mirror 4 may be interconnected by cementing or clamping.

It will be obvious that the invention is not restricted to the embodiments described above and that within the scope of the invention many variants are possible to those skilled in the art. For example, instead of the flat mirrors 2, 4 and 5 curved or total-reflection roof prisms, conventionally used in optical masers, may be employed. A total-reflection roof prism is shown in FIG. 8 in a sectional view for the sake of clarity. The apex B is about 90°. The mirrors need not be formed by a metallized surface of a body of glass for example. In optics use is frequently made of mirrors consisting of a dielectric layer applied to a support, for example, of glass. With these mirrors the absorption of the incident radiation is very small and such mirrors may be advantageously used in an optical maser according to the invention. Moreover, the piezoelectric body and the electro-optical body may consist of other conventional piezoelectric or electro-optical materials respectively. The length of the optical path between a dividing mirror and a reflector mirror may also be regulated with the aid of a body having magnetostriction, that is expansion or shrinkage under the action of a magnetic field. For example, the cylinder 36 of FIG. 3 may be replaced by a cylinder of nickel, for instance, which is surrounded by turns of a conductor. By passing an electric current through the winding, a magnetic field is produced inside the winding, so that the length of the cylinder is varied. Moreover, the lengths of the optical paths between the dividing mirror and the reflector mirrors may be adjustable.

What is claimed is:

1. An optical maser comprising an active masing medium in which stimulated emission of radiation can be produced, radiation-reflecting means associated with the said active medium and defining an optical axis therebetween for causing the radiation to continuously traverse the active medium by multiple reflections in directions substantially parallel to said optical axis, and means for extracting a portion of the reflected radiation from the active medium and for controlling the intensity of the extracted radiation, said controlling-extracting means comprising means for receiving radiation from the active medium and for dividing same into a transmitted portion and a reflected portion, reflector means positioned to receive the transmitted and reflected portions and reflect them back to the dividing means, a portion of the reflected radiation reimpinging on the dividing means emerging as the output beam and another portion being returned to the active medium, and means for controlling the length of optical path for the radiation between the dividing means and the reflector means to control the phase difference between the reflected radiations whose paths coincide and thus the intensity of the emerging output beam.

2. An optical maser comprising an active masing medium in which stimulated emission of radiation can be produced, radiation-reflecting means associated with the said active medium and defining an optical axis therebetween for causing the radiation to continuously traverse the active medium by multiple reflections in directions substantially parallel to said optical axis, and means for extracting a portion of the reflected radiation from the active medium and for controlling the intensity of the extracted radiation, said controlling-extracting means comprising a substantially flat, partially transparent dividing mirror having the characteristic that radiation impinging thereon is divided into a transmitted portion and a reflected portion, said dividing mirror being positioned to receive radiation from the active medium and such that a perpendicular to a surface thereof forms an acute angle of more than 0° but less than 90° to the said optical axis, a first substantially nontransparent reflector positioned to receive the said transmitted portion and reflect it back to the dividing mirror, a second substantially nontransparent reflector positioned to receive the reflected portion and reflect it back to the dividing mirror, a portion of the reflected radiation reimpinging on the dividing mirror emerging as the output beam and another portion being returned to the active medium, and means for controlling the length of optical path for the radiation between the dividing mirror and at least one of the first and second reflectors to control the phase difference between the reflected radiations whose paths coincide and thus the intensity of the emerging output beam.

3. An optical maser as claimed in claim 2 wherein the energy reflection of the dividing mirror is less than 50 percent.

4. An optical maser as claimed in claim 3 wherein the energy reflection of the dividing mirror is less than 15 percent.

5. An optical maser as claimed in claim 3 wherein the optical-path-controlling means is located between the dividing mirror and the second reflector.

6. An optical maser as claimed in claim 2 wherein the energy reflection of the dividing mirror is more than 50 percent.

7. An optical maser as claimed in claim 6 wherein the energy reflection of the dividing mirror is more than 85 percent.

8. An optical maser as claimed in claim 6 wherein the optical-path-controlling means is located between the dividing mirror and the first reflector.

9. An optical maser comprising an active masing medium in which stimulated emission of radiation can be produced, radiation-reflecting means associated with the said active medium and defining an optical axis therebetween for causing the radiation to continuously traverse the active medium by multiple reflections in directions substantially parallel to said optical axis, and means for extracting a portion of the reflected radiation from the active medium and for controlling the intensity of the extracted radiation, said controlling-extracting means comprising a substantially flat, partially transparent dividing mirror having the characteristic that radiation impinging thereon is divided into a transmitted portion and a reflected portion, said dividing mirror being positioned such that a perpendicular to a surface thereof forms an acute angle more than 0° but less than 90° to said optical axis, a first substantially nontransparent, substantially flat, mirror reflector positioned to receive the said transmitted portion and reflect it back to the dividing mirror, a second substantially nontransparent, substantially flat, mirror reflector positioned to receive the reflected portion and reflect it back to the dividing mirror, a transparent body, one of said mirror reflectors being mounted on a side surface of said body and the dividing mirror being mounted along a diagonal plane of said body, a cross section through said body at right angles to said diagonal plane forming a quadrangle, a portion of the reflected radiation reimpinging on the dividing mirror emerging as the output beam an another portion being returned to the active medium, and means for controlling the length of optical path for the radiation between the dividing mirror and at least one of the first and second reflectors to control the phase difference between the reflected radiations whose paths coincide and thus the intensity of the emerging output beam.

10. An optical maser as claimed in claim 9 wherein the perpendicular to the dividing mirror surface is at an angle of 45° to the said optical axis, and the transparent body forms a square section at right angles to the diagonal plane.

11. An optical maser as claimed in claim 9 wherein the active medium comprises an elongated solid medium, and the transparent body is formed by an end portion of said elongated solid medium.

12. An optical maser as claimed in claim 9 wherein a perpendicular to the plane of incidence formed by the said surface of the transparent body opposite the side surface provided with a reflector mirror is at an angle equal to Brewster's angle to the said optical axis, and radiation parallel to said optical axis incident to the said plane of incidence can emerge from the transparent body via a side surface only in a direction which is at an angle equal to Brewster's angle to a perpendicular to the side surface through which the radiation emerges.

13. An optical maser comprising an active masing medium in which stimulated emission of radiation can be produced, radiation-reflecting means associated with the said active medium and defining an optical axis therebetween for causing the radiation to continuously traverse the active medium by multiple reflections in directions substantially parallel to said optical axis, and means for extracting a portion of the reflected radiation from the active medium and for controlling the intensity of the extracted radiation, said controlling-extracting means comprising means for receiving radiation from the active medium and for dividing same into a transmitted portion and a reflected portion, reflector means positioned to receive the transmitted and reflected portions and reflect them back to the dividing means, a portion of the reflected radiation reimpinging on the dividing means emerging as the output beam and another portion being returned to the active medium, and means for controlling the length of optical path for the radiation between the dividing means and the reflector means to control the phase difference between the reflected radiations whose paths coincide and thus the intensity of the emerging output beam, said optical-path-controlling means including means for displacing at least some of the reflector means.

14. An optical maser as claimed in claim 13 wherein said displacing means comprise a piezoelectric body coupled to a reflector mirror constituting part of the reflector means.

15. An optical maser as claimed in claim 9 wherein the controlling means comprises a piezoelectric body mechanically coupled between the transparent body and a mirror reflector.

16. An optical maser as claimed in claim 15 wherein the piezoelectric body is formed by a cylinder of piezoelectric material having an internally and an externally metallized surface, and connections to the metallized surfaces between which an electrical voltage can be applied, the mirror reflector and the transparent body closing opposite ends of the cylinder.

17. An optical maser as claimed in claim 13 wherein the displacing means comprises a magnetostrictive body coupled to a mirror reflector.

18. An optical maser as claimed in claim 9 wherein the controlling means comprise a magnetostrictive body mechanically coupled between the transparent body and a mirror reflector.

19. An optical maser as claimed in claim 18 wherein the magnetostrictive body is formed by a cylinder of magnetostrictive material, the mirror reflector and the transparent body closing opposite ends of the cylinder, and a conductive winding surrounds the cylinder.

20. An optical maser comprising an active masing medium in which stimulated emission of radiation can be produced, radiation-reflecting means associated with the said active medium and defining an optical axis therebetween for causing the radiation to continuously traverse the active medium by multiple reflections in directions substantially parallel to said optical axis, and means for extracting a portion of the reflected radiation from the active medium and for controlling the intensity of the extracted radiation, said controlling-extracting means comprising means for receiving radiation from the active medium and for dividing same into a transmitted portion and a reflected portion, reflector means positioned to receive the transmitted and reflected portions and reflect them back to the dividing means, a portion of the reflected radiation reimpinging on the dividing means emerging as the output beam and another portion being returned to the active medium, and means for controlling the length of optical path for the radiation between the dividing means and the reflector means to control the phase difference between the reflected radiations whose paths coincide and thus the intensity of the emerging output beam, said optical-path-controlling means including an electro-optical body positioned to be transversed by the radiation, said electro-optical body having a voltage controllable refractive index.

UNITED STATES PATENT OFFICE
CERTIFICATE OF CORRECTION

Patent No. 3614655            Dated October 19, 1971

Inventor(s) BOUWE BOLGER

It is certified that error appears in the above-identified patent and that said Letters Patent are hereby corrected as shown below:

Col. 5, line 9, before "the" a parenthesis should be inserted;

Col. 5, line 11, after "respectively." a parenthesis should be inserted;

Col. 5, line 22, "25" should read -- 15 --;

Col. 9, line 24, "an" should read -- and --.

Signed and sealed this 18th day of April 1972.

(SEAL)
Attest:

EDWARD M. FLETCHER, JR.            ROBERT GOTTSCHALK
Attesting Officer            Commissioner of Patents